Oct. 7, 1924.
W. H. FULTON
1,510,548
PIPE COUPLING
Filed April 13, 1921
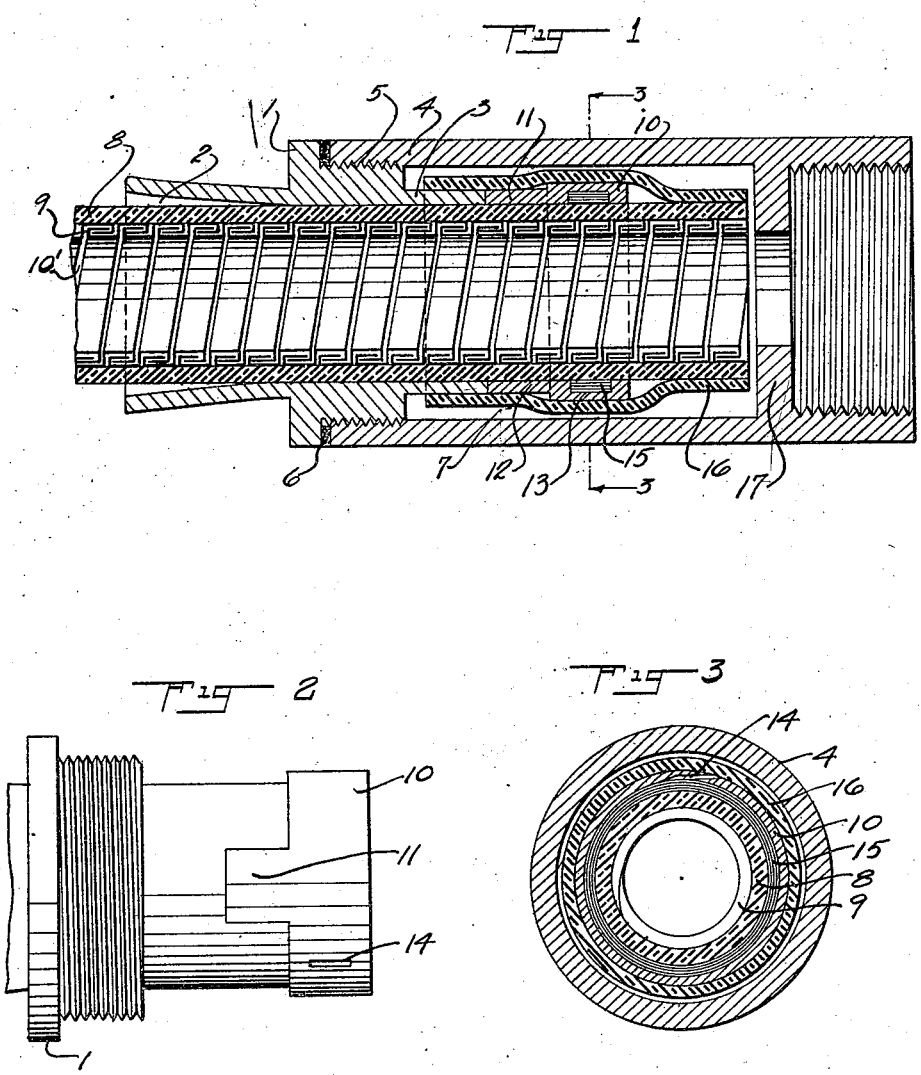
William H. Fulton, Inventor
By his Attorney
Thomas Howe Patented Oct. 7, 1924.

1,510,548

UNITED STATES PATENT OFFICE.

WILLIAM H. FULTON, OF IRVINGTON, NEW JERSEY, ASSIGNOR TO TITEFLEX METAL HOSE CORPORATION, A CORPORATION OF NEW YORK.

PIPE COUPLING.

Application filed April 13, 1921. Serial No. 461,060.

*To all whom it may concern:*

Be it known that I, WILLIAM H. FULTON, a citizen of the United States of America, residing at Irvington, county of Essex, and State of New Jersey, have invented new and useful Improvements in Pipe Couplings, of which the following is a specification.

This invention relates to an improved fitting embodying means whereby the end of a hose or pipe may be secured to a union whereby the pipe may be attached to a terminal fitting or to another length of pipe, either flexible or stiff.

The present invention is an improvement upon or modification of the couplings as set forth in my Patents No. 1,329,759 granted February 3rd, 1920, and No. 1,368,919 granted February 15, 1921, and involves a different manner of securing the hose to the fitting.

The main object of the present invention is to provide improved means for securing the hose to the fitting.

Other and ancillary objects of the invention will appear hereinafter.

In the accompanying drawings which illustrate the invention—

Fig. 1 is a central longitudinal section of a coupling and hose embodying the invention;

Fig. 2 is a side elevation of a portion of the coupling as will be hereinafter referred to; and Fig. 3 is a section on the line 3—3 of Fig. 1.

Referring to the drawings, the fitting comprises a body portion 1 having a fluid passage 2 and a tubular extension 3 which is surrounded by a sleeve 4 screw threaded at 5 to the body 1. To avoid leakage a packing ring 6 may be inserted between the end of the sleeve 4 and the fitting body.

Between the sleeve 4 and the extension 3 is formed a chamber 7 which is in communication with the fluid passage. The conduit or flexible tube, as a whole, comprises a flexible tube 8 of rubber within which is a strengthening or reinforcing tube 9 formed from a helically disposed strip of metal having the edges of adjacent convolutions interfolded, there being clearances as 10' in the joints to permit flexing of the tube. The flexible tube thus formed of the rubber tube and the re-inforcing tube is passed through the fluid passage 2 and also through the member 10 so as to project some distance therebeyond as shown in Fig. 1.

The member 10 has projections 11 and 12 entering corresponding recesses in the extension 3 so as to be held against turning and further has an interiorly opening annual recess 13 which communicates by a slot 14 with its exterior surface.

Within the recess 13 is a coil of metal tape or ribbon 15 whereby the member 10 is gripped to the tube or conduit. Placed so as to come in contact with the end of the tube and also to overlap the extension 3 as shown, is a rubber sleeve 16 of such size and elasticity that when placed in position it tightly grips the end of the conduit and also the extension 3 so that a fluid tight seal is formed between the conduit and the fitting. When the pressure of the fluid passing through the device is increased, the sleeve 10 will be the more tightly held to the conduit and to the fitting so that the tightness of the joint may be relied upon under all degrees of fluid pressure.

A flange 17 upon the member 4 acts as a stop, which positively prevents the sliding of the conduit too far to the right (see Fig. 1).

In assembling the conduit with the fitting, the hose is passed through the member 1 from which the member 4 is removed. The end of the hose is passed through the member 10 to a suitable distance, such as is indicated in Fig. 1. The end of the ribbon 15 is entered within the slot 14 and the member 10 rotated about the conduit thereby coiling the tape upon itself as indicated in Fig. 1 and this process is continued until sufficient layers have been formed to produce the desired clamping force upon the conduit. It will, of course, be understood that during this operation the conduit will have been drawn through the member 1 to such an extent that the projections 11 and 12 will not engage with the extension 3. The member 10 having been thus clamped to the conduit, the latter is drawn to the left (Fig. 1) so that the projections 11 and 12 are entered within the recesses in the extension 3. The sleeve 16 is then placed in position as described, the packing ring 6 is placed in position and the sleeve 4 screwed home upon the body 1.

It will now be seen that the member 10 clamped to the conduit prevents its withdrawal to the left from the member 1, while the flange 17 prevents undue movement in the opposite direction; also that the sleeve 16 provides a fluid tight joint between the fitting and the conduit which is the more securely held in position, the higher the pressure of the fluid transmitted. While it is usually desirable to have the strengthening tube 9 co-extensive with the rubber tube 8 in order that the rubber tube may be reinforced against tensile strains, if the circumstances are such that this tensile reinforcement is not necessary, the tube 9 may be replaced by a short ferrule, collar or sleeve substantially co-extensive with the member 10, and directly within it, so as to serve as a reinforcement of the rubber tube against the clamping force exerted by the ribbon coil 15.

While the invention has been illustrated in what is considered its best application it may have other embodiments without departing from its spirit and is not, therefore, limited to the structure shown in the drawings.

What I claim is:

1. The combination with a fitting, having a fluid passage, of a flexible tube extending therethrough, means clamped to said tube for preventing its withdrawal, an inner flexible metal tube reinforcing said tube against the pressure of said clamping means and a flexible sleeve surrounding said clamping means and engaging said tube and fitting and forced thereagainst by the fluid pressure of said passage.

2. The combination with a fitting having a fluid passage, of a tube extending therethrough and means secured to said tube for preventing its withdrawal from the fitting in one direction, an outer sleeve having a flange for limiting the movement of said tube through said fitting in the opposite direction and a flexible sleeve surrounding said means and engaging said tube and fitting and forced thereagainst by the fluid pressure of said passage.

3. The combination with a fitting having a fluid passage, of a tube extending therethrough, said tube comprising an outer flexible member and an inner metallic member, means secured to said tube for preventing its withdrawal, a flexible sleeve surrounding said means and engaging said tube and fitting and forced thereagainst by the fluid pressure of said passage and means for preventing rotation of said tube with relation to the fitting.

4. The combination with a fitting having a fluid passage, of a flexible tube extending through said passage, a reinforcing means comprising a flexible metal tube for the interior of said tube, said fitting having a tubular extension and a sleeve surrounding said extension and spaced therefrom to form a chamber and communicating with said passage, means clamped to said tube and adapted to engage the end of said extension to prevent withdrawal of the tube from the fitting and a flexible sleeve engaging with said tube and said extension and surrounding said clamping means and adapted to be pressed more securely in position by the pressure of said passage, and a flange upon the first mentioned sleeve adapted to limit longitudinal movement of said tube with relation to said fitting in one direction.

5. The combination with a fitting having a fluid passage, of a flexible tube extending therethrough, said tube comprising an outer member and an inner flexible metallic member, said metallic member reenforcing said flexible tube, means secured to said tube for preventing its withdrawal from the fitting and a flexible sleeve surrounding said means and engaging said tube and fitting and forced thereagainst by the fluid pressure of said passage.

6. The combination with a coupling having a passage of a hose extending therein, comprising a flexible metal tube and a rubber tube about the same, means for securing said hose to said coupling and a flexible sleeve bearing against said coupling and rubber tube, said coupling having a chamber open to the pressure through said hose and said sleeve adapted to be pressed against said hose and coupling by said pressure to make a tight joint therebetween.

In testimony whereof I have signed this specification this 5th day of April 1921.

WILLIAM H. FULTON.